(12) United States Patent
Schnapp

(10) Patent No.: US 6,286,384 B1
(45) Date of Patent: Sep. 11, 2001

(54) LOCKING MECHANISM FOR A SELECTOR SHAFT OF A CHANGE-SPEED GEARBOX FOR PREVENTING INADVERTENT SHIFTING INTO REVERSE

(75) Inventor: Peter Schnapp, Nürnberg (DE)

(73) Assignee: INA Wälzlager Schaeffler oHG, Herzogenaurach (DE)

( * ) Notice: Subject to any disclaimer, the term of this patent is extended or adjusted under 35 U.S.C. 154(b) by 0 days.

(21) Appl. No.: 09/349,580

(22) Filed: Jul. 8, 1999

(30) Foreign Application Priority Data

Jul. 10, 1998 (DE) .............................. 198 31 066

(51) Int. Cl.[7] .................................. B60K 20/00
(52) U.S. Cl. ............................. 74/473.22
(58) Field of Search .......................... 74/473.22

(56) References Cited

FOREIGN PATENT DOCUMENTS

| 30 16 909 C2 | 11/1981 | (DE) . |
|---|---|---|
| 36 01 954 C2 | 7/1987 | (DE) . |
| 44 32 238 A1 | 3/1996 | (DE) . |

Primary Examiner—Lenard A. Footland
(74) Attorney, Agent, or Firm—Henry M. Feiereisen

(57) ABSTRACT

A shift control apparatus for use in a change-speed gearbox of motor vehicles includes a housing, a selector shaft axially slidably and rotatably supported in the housing and operatively connected to a gear selector lever for axial displacement of the selector shaft to realize a preselection of a shifting lane and rotation of the selector for shift into a selected gear, a shifter finger secured to the selector shaft and engaging slidable shifter forks or shifter bars, and a restraining mechanism for preventing a misshift between a reverse gear and a forward gear positioned in a same shifting lane. The restraining mechanism includes a transmission element mounted in fixed rotative engagement to the selector shaft and having a flanged edge, and a restraining member rotatable and axially moveable in parallel relationship to the selector shaft. The restraining member has a locking surface forming a deflector ramp for support of the flanged edge of the transmission element, thereby effecting a deflection, i.e. rotation and displacement of the transmission element.

18 Claims, 5 Drawing Sheets

LOCKING MECHANISM FOR A SELECTOR SHAFT OF A CHANGE-SPEED GEARBOX FOR PREVENTING INADVERTENT SHIFTING INTO REVERSE

CROSS-REFERENCES TO RELATED APPLICATIONS

This application claims the priority of German Patent Application Serial No. 198 31 066.8, filed Jul. 10, 1998, the subject matter of which is incorporated herein by reference.

BACKGROUND OF THE INVENTION

The present invention relates, in general, to a mechanically operated change-speed gearbox for use in motor vehicles, and more particularly to a shift control apparatus for a change-speed gearbox, including a locking mechanism for preventing a misshift between a forward gear and a reverse gear when actuating a gear selector lever which is operatively connected to a selector shaft.

Locking mechanisms, also known as reverse gear lock-out mechanism, are used in gearboxes to prevent a shift-through from a forward gear into reverse gear, when these gears are positioned in a same linear shifting lane. Erroneous shifting into reverse gear, that may occur if the selector lever were to be moved directly from one forward gear to the reverse gear, are thereby prevented and the gears are protected from damage so that serious damage of the shift control mechanism is avoided. Typically, the reverse gear lock-out mechanism is so structured that the selector lever must be first moved into neutral before clearing the shifting lane to the reverse gear and allowing a shift into reverse.

German Pat. No. DE-C 36 01 954 describes a reverse gear lock-out mechanism having a shift control mechanism with a selector shaft which includes a shifter finger for interaction with a gear shifting gate that is mounted to the housing wall of the gearbox. The shifting gate includes the shifting lane for the gear selection and has a prolongation which accommodates a locking mechanism in communication with a second shifter finger. The locking mechanism includes a plate which is swingably mounted to the shifting gate and held in neutral by a leg spring and swingable in two directions. The plate has a top side formed with a locking cam with a so-called arched catch, for cooperation with the second shifter finger. When changing from the fifth gear to the fourth gear, the second shifter finger strikes against the locking cam to thereby prevent a shift-through along a straight line into the reverse gear which is positioned in the same shifting lane as the fifth gear. The restraining action realizes a diverting of the shifter finger into the neighboring shifting lane. This conventional reverse gear lock-out mechanism suffers the drawback that a great number of components and a substantial space for installation are required because the shifting gate, guiding the shifter fingers which are radially aligned with respect to the selector shaft, is arranged parallel and offset to the selector shaft. As a consequence of the interaction between the shifter fingers and the shifting gate, the manufacture of the individual components as well as the installation and adjustment of the conventional locking mechanism demands high precision.

SUMMARY OF THE INVENTION

It is thus an object of the present invention to provide an improved shift control apparatus for use in motor vehicles, obviating the afore-stated drawbacks.

In particular, it is an object of the present invention to provide an improved shift control apparatus with a locking mechanism for preventing inadvertent shifting into reverse gear, which locking mechanism is simple in structure and cost-efficient, and yet is reliable in operation and enhances the shifting comfort.

These objects, and others which will become apparent hereinafter, are attained in accordance with the present invention by providing a selector shaft which is axially slidably and rotatably supported by a housing and operatively connected to a gear selector lever for preselecting a shifting lane through axial displacement and shift into a selected gear through rotation, a shifter finger secured to the selector shaft and engaging slidable shifter forks or shifter bars, and a locking mechanism for preventing a misshift between a reverse gear and a forward gear in a same shifting lane, with the locking mechanism including a transmission element mounted in fixed rotative engagement to the selector shaft and having a flanged edge, and a restraining member rotatable and axially moveable in parallel relationship to the selector shaft, whereby the restraining member has a locking surface forming a deflector ramp for support of the flanged edge of the transmission element.

The provision of the deflector ramp improves the shifting comfort as the pure locking action is deviated into a deflecting motion. During change to a different gear between two gears in a shifting lane, i.e. from forward gear to reverse gear, the selector shaft executes a rotational movement. At the same time, the deflector ramp of the restraining member triggers a force component in axial direction in synchronism to the rotational movement. Therefore, this gear change results in a smooth deflection of the transmission element into neutral, thereby enhancing the shift feel. This deflection leads to a reduced strain of all components that make up the locking system.

An effective locking surface can be established when the deflector ramp extends at an angle from about 55° to 60° with respect to a longitudinal bore or guide bore of the restraining member, whereby the deflector ramp, when installed, is inclined with respect to the transmission element. Certainly, the deflector ramp may be configured in different ways, without departing from the spirit of the present invention. Suitably, the deflector ramp is designed as a slanted straight line. Alternatively, the deflector ramp may also exhibit a convex or concave pattern to influence the shift feel. These types of deflector ramps realize a planned accelerated or delayed deflection of the transmission element and of the shifting components interconnected therewith.

According to another feature of the present invention, the restraining member may be adjustable with respect to the transmission element. Adjustability of the restraining member permits a compensation of encountered tolerances of all components making up the locking mechanism as well as of the transmission element, selector shaft and restraining member. Thus, the shifting comfort is further enhanced.

The adjustment of the restraining member can be implemented in several ways. In one embodiment, adjustment of the restraining member is realized by inserting into the housing an adjustment screw, for example a stud screw, upon which the restraining member directly rests. After completing the adjustment, the adjustment screw can be secured, for example, by a retainer element, to inhibit a self-inflicted repositioning of the adjustment screw. Another embodiment includes the provision of a key pin by which the position of the restraining member can be adjusted. The key pin is suitably formed with a cylindrical section for insertion in a bore which is provided in the housing in axis-parallel disposition to the receiving bore of the restraining member, with the key pin being pushed into the housing until its wedge surface interacts with a corresponding contact surface of the restraining member. Once adjustment of the restraining member has been carried out, the key pin is suitably fixed in place in the housing.

According to another feature of the present invention, the restraining member may have a tubular section which is guided on an axle fitted in the housing. In this manner, the restraining member is securely guided and prevented from tilting. On one end, the tubular section of the restraining member may be provided with a radial first guide segment which forms the deflector ramp and interacts with the flanged edge of the transmission element. The tubular section of the restraining member may further be provided with a second guide segment which extends angularly offset to the first guide segment and also interacts with the inside wall of the housing.

According to another feature of the present invention, the flanged edge of the transmission element may be provided with a guide surface which corresponds to the deflector ramp to thereby replace a line contact with a flat engagement of both components. The increased contact surface advantageously reduces wear.

BRIEF DESCRIPTION OF THE DRAWING

The above and other objects, features and advantages of the present invention will now be described in more detail with reference to the accompanying drawing, in which:

FIG. 1a is a diagrammatic outline of the shifting lane that a gear selector lever may be moved for shifting into various gears;

DETAILED DESCRIPTION OF PREFERRED EMBODIMENTS

Figure 1:
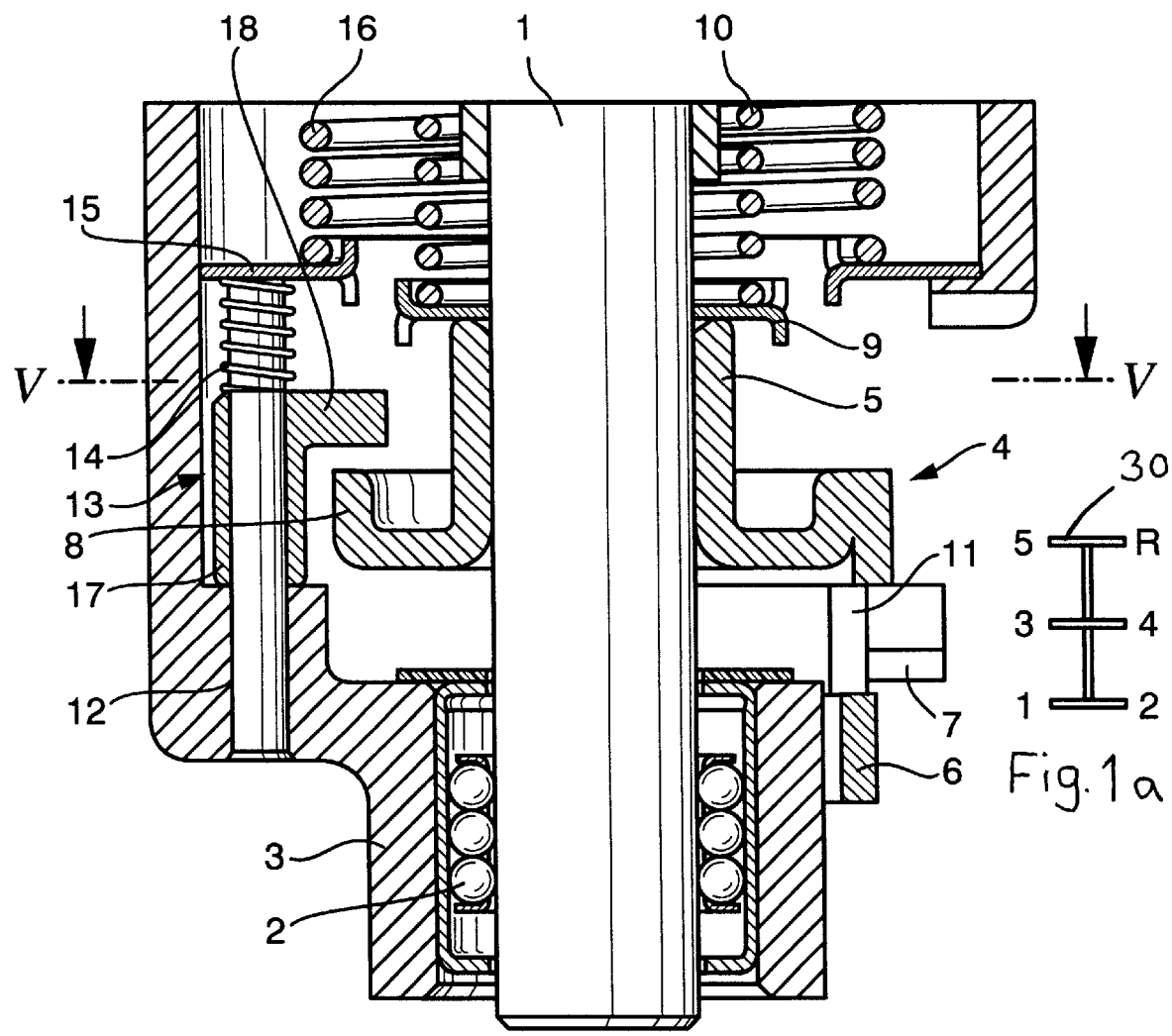
FIG. 1 is a partial, sectional view of an exemplified change-speed gearbox, incorporating a locking mechanism according to the present invention.

Throughout all the Figures, same or corresponding elements are generally indicated by same reference numerals.

Turning now to the drawing, and in particular to FIG. 1, there is shown an exemplary embodiment of a change-speed gearbox including a gearbox housing 3 which has fitted therein a shifter or selector shaft 1. The selector shaft 1 is rotatably and axially slidably supported in the housing 3 by a roller bearing 2 and actuated by a gear selector lever (not shown). Securely fixed to the selector shaft 1 at an axial distance to the roller bearing 2 is a transmission element, generally designated by reference numeral 4 and including a bushing 5 a gear selection gate 6, for interaction with a shifter finger 7. The bushing 5 is secured to the selector shaft 1 in fixed rotative, non-positive engagement, e.g. by a press-fit, and has a pot-shaped flanged edge 8 which faces away from the roller bearing 2. At the flanged edge distal end, the bushing 5 supports a retention plate 9 of sheet metal for support of one end of a compression spring 10 which tends to load the selector shaft 1 in the direction toward the roller bearing 2. The flanged edge 8 concentrically embraces the selector shaft 1 by an angle of about 180° and carries the selector gate 6 which extends on one side from the bushing 5 in the direction of the roller bearing 2. The selector gate 6 is operatively connected with the shifter finger 7 which projects radially outwards and is guided in a shifting lane 30 when being installed. A diagrammatic outline of the shifting pattern 30 for an exemplified gearbox, involved here, is illustrated in FIG. 1a and includes three linear shifting lanes 30 in parallel relationship for five forward gears and a reverse gear R for movement of the gear selector lever. The shifter finger 7 is received in a rectangular cutout 11 of the selector gate 6. Although not shown in detail, the shifter finger 7 selectively engages grooves of shifter forks to effect a change between the gears.

Fitted in a bore of the housing 3 in parallel offset disposition to the selector shaft 1 is a rod or axle 12 for support of a locking mechanism for preventing an erroneous shifting operation between a forward gear, here the fifth gear, and the reverse gear positioned in the same shifting lane 30. The locking mechanism includes a restraining member, generally designated by reference numeral 13 and including a tubular body 17 which is rotatably supported and axially slidably guided on the axle 12 in opposition to the force of a torsional compression spring 14. The torsional compression spring 14 rests with one end on the tubular body 17 of the restraining member 13 and with its other end against a support plate 15 of sheet metal which is secured to the housing 3. Resting against the axle-distal side of the support plate 15 is a further compression spring 16.

Figure 2:
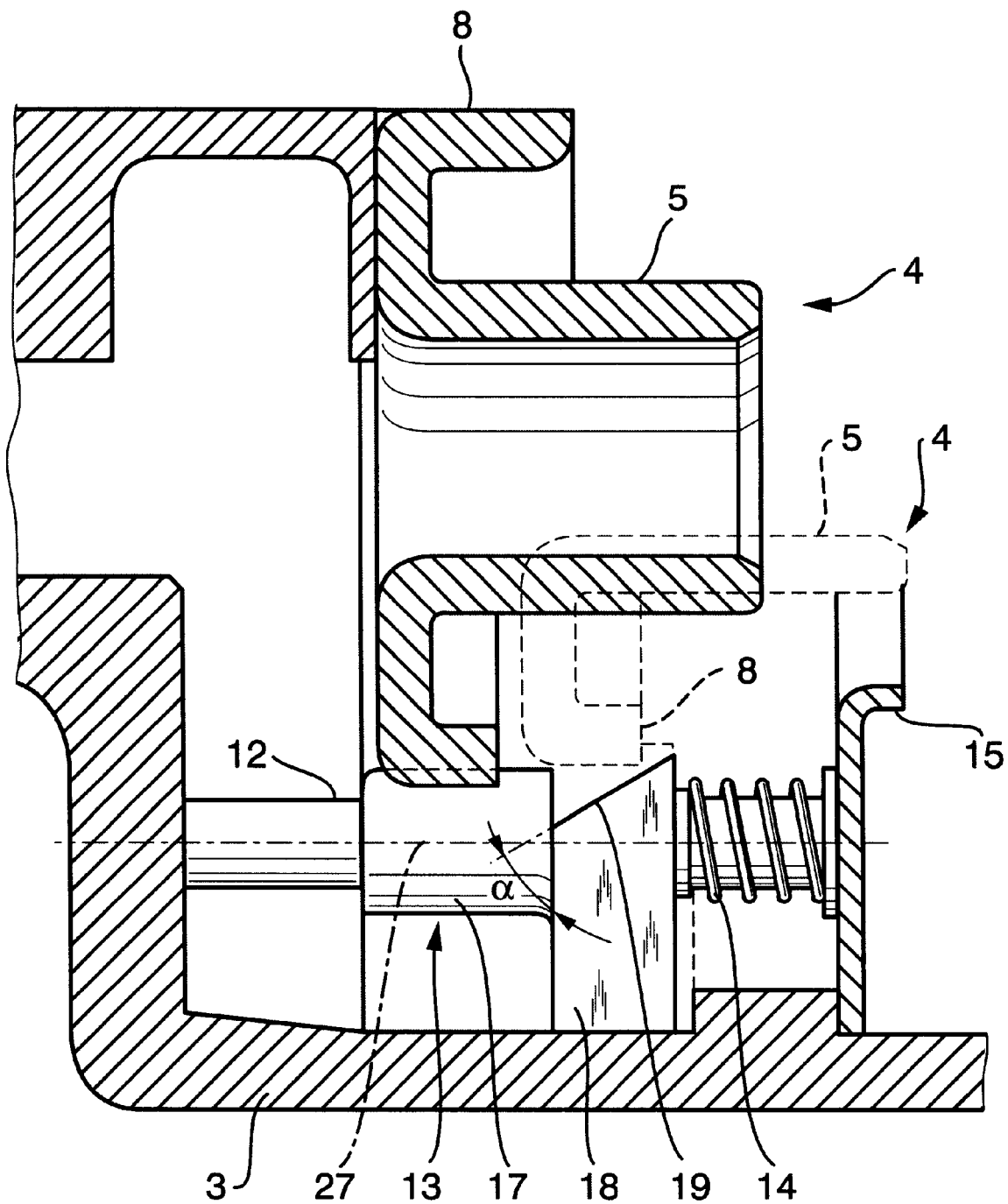
FIG. 2 is a sectional view, on an enlarged scale, of the gearbox of FIG. 1, showing in detail the interaction between the restraining member and the transmission element.

Formed in one piece with and extending radially from the tubular body 17 of the restraining member 13 at the support plate proximal end is a guide segment 18 which forms a deflector ramp 19, as shown in FIG. 2, and interacts with the flanged end 8 of the transmission element 4 in a manner to be described furtherbelow.

The selector shaft 1 is part of a shift control mechanism and is rotatably supported for preselection of the respective shifting lane 30 and axially slidable for shifting into the gears, whereby the selector shaft 1 is provided with the transmission element 4 to which the shifter finger 7 is mounted and guided in the shifting lane 30. The arrangement of the gears in the shifting lanes 30, as illustrated in FIG. 1a, shows that the provision of a locking mechanism is only necessary where a forward gear, here the fifth gear, is located in the same shifting lane 30 as the reverse gear R.

Figure 3:
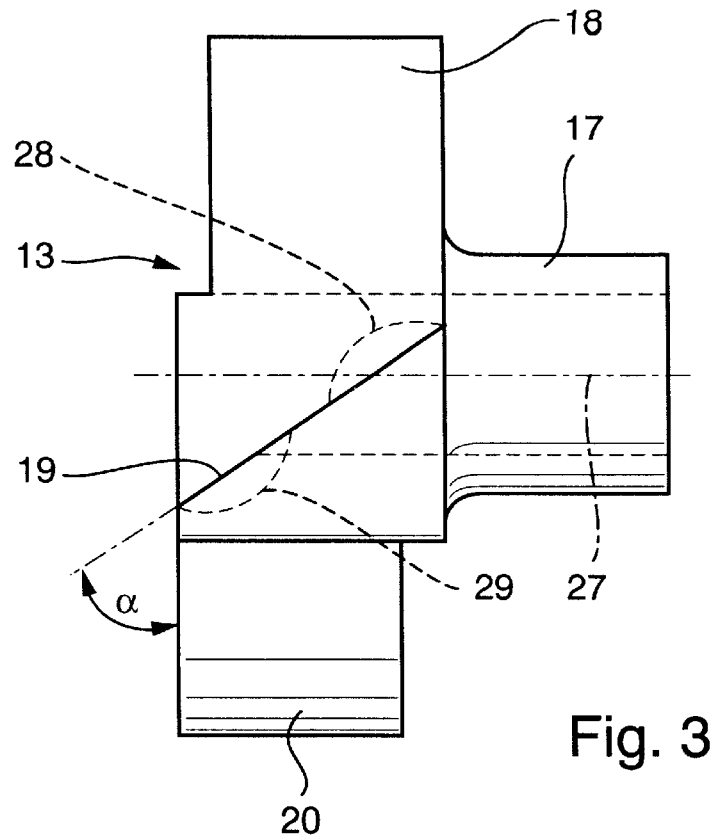
FIG. 3 is a side view of a restraining member according to the present invention.
Figure 4:
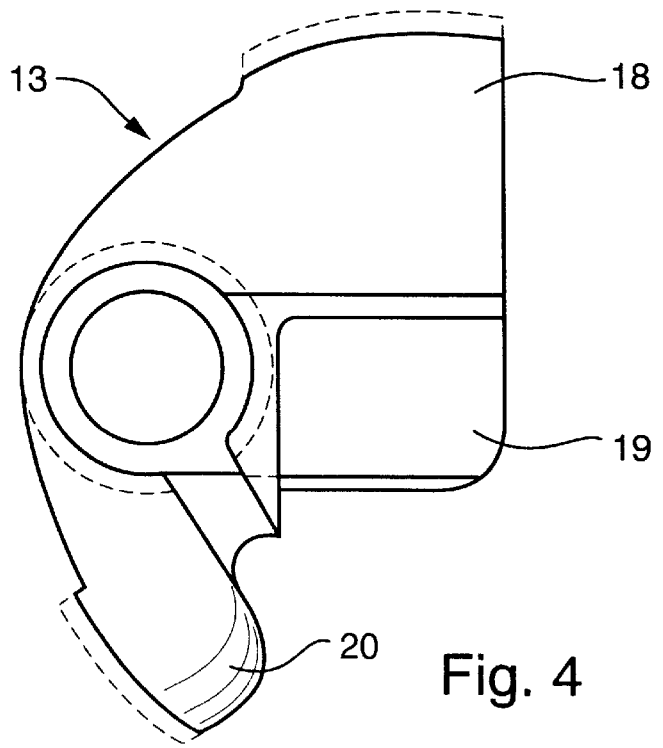
FIG. 4 is a front view of the restraining member of FIG. 3.

Turning now to FIGS. 3 and 4, there are shown a side view and front view, respectively, of the restraining member 13. As shown in FIG. 3, the restraining member 13 is formed with a guide segment 20 for interaction with the housing 3, as will be described furtherbelow. The deflector ramp 19 is configured as slanted straight line which extends at an angle a of about 55° to 60° with respect to the longitudinal axis 27 defined by the tubular body 17 of the locking member 13. Indicted in broken lines are two modifications of the deflector ramp with a concave section 28 and/or convex section 29, to thereby realize an accelerated or delayed deflecting movement of the transmission element 4 and thus of the selector shaft 1. FIG. 4 shows in more detail the configuration of the guide segments 18, 20 which include each an arcuated section by which the restraining member 13 rests against the housing 3.

Figure 5:
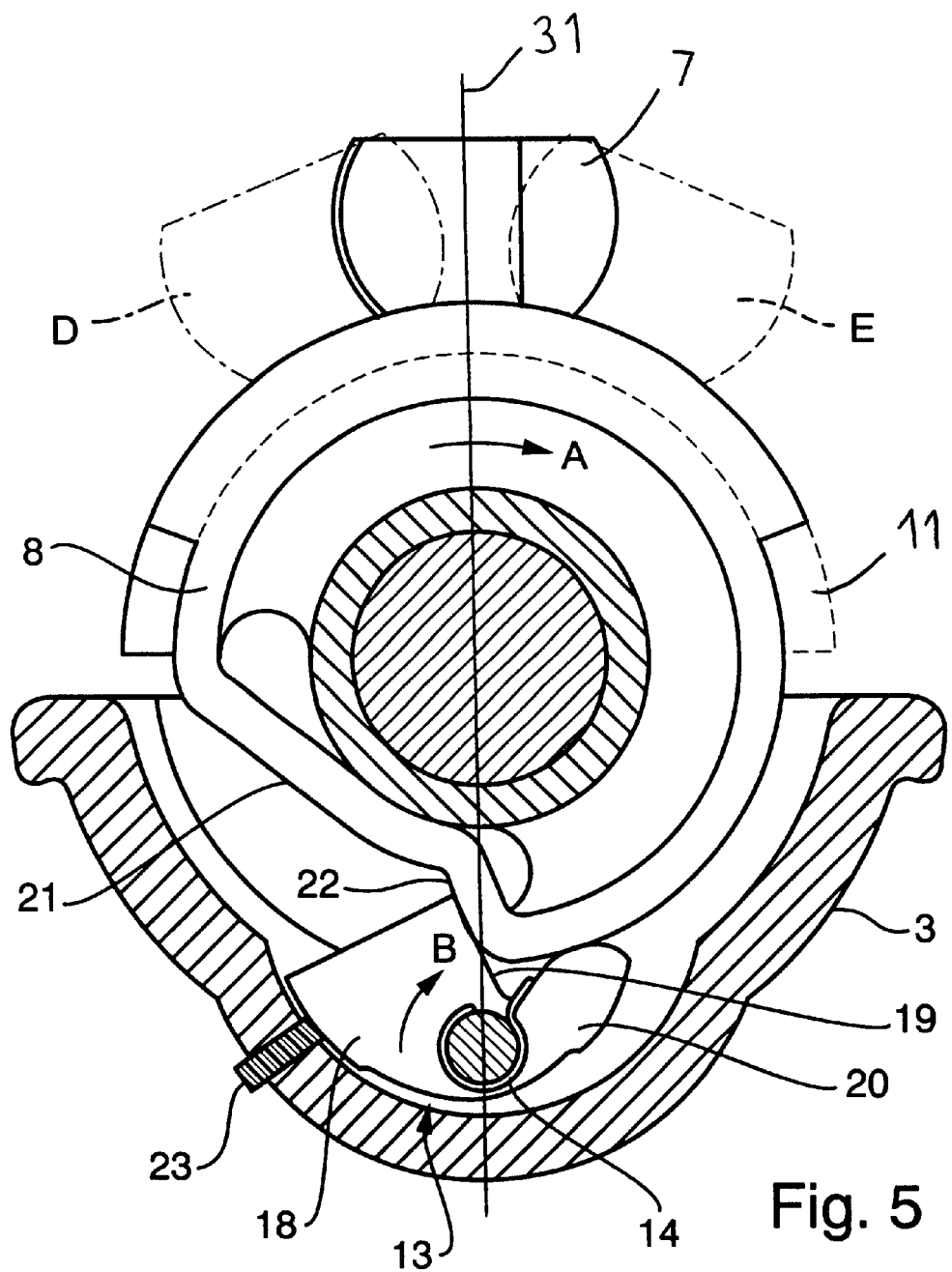
FIG. 5 is a sectional view of the gearbox, taken along the line V—V in FIG. 1, with symbolic illustration of the shifting pattern.

FIG. 5 shows a front view of the bushing 51 taken along the line V—V in FIG. 1, and it can be seen that the flanged edge 8 of the bushing 5 is flattened over an area of approximately 90° in the zone that is not embraced by the selector gate 6 to form a cam surface 21. Formed at the junction from the cam surface 21 to the circular ring shaped flanged edge 8 in the region of the restraining member 13 is a ramp 22 which, depending on a gear selector position of the selector shaft 1, is partially circumscribed by the restraining member 13. FIG. 5 shows the selector shaft 1 in the center position, i.e. so aligned that the shifter finger 7 extends together with the axle 12 of the restraining member 13 on a vertical plane 31.

The locking mechanism according to the present invention is so configured that at a shift from the fourth gear to the fifth gear, i.e. when changing the shifting lane, the flanged end 8 of the transmission element 4 impacts on the guide segment 18 of the restraining member 13 and moves the guide segment 18 in axial direction along the axle 12 in opposition to the spring force applied by the compression spring 14. When rotating the selector shaft 1 by means of the gear selector lever into the fifth forward gear in correspondence to the selection position "D" of the shifter finger 7, as shown in FIG. 5, the restraining member 13 turns in rotation direction "B" and rests with the guide segment 20 against the housing 3. A change back from the fifth gear into the fourth gear requires a turning of the selector shaft 1 into the center position in which the ramp 22 at the flanged edge 8 rotates the restraining member 13 via the guide segment 18 in opposition to the rotation direction "B" until the guide segment 18 rests against the housing 3. The restraining member 13 thus prevents a further rotation of the selector shaft 1 in rotation direction "A" and thereby blocks a shift-through from the forward gear into the reverse gear R.

A change into the reverse gear R requires first a movement of the selector shaft 1 into neutral and then a movement into the neighboring shifting lane 30, that is until the guide segment 18 is offset to the ramp 22 to permit a rotation of the restraining member 13 until the guide segment 20 impacts upon the housing 3 as a result of the spring action applied by the torsional compression spring 14. Subsequently, the selector shaft 1 can again be displaced axially and rotated to displace the shifter finger 7 into the position "E", indicated by dashdot line in FIG. 5 and representing the reverse gear position.

The locking mechanism is shown, on an enlarged scale, in FIG. 2 which illustrates the interaction of the restraining member 13 with the transmission element 4, whereby the transmission element 4 is shown in two positions. The first position represents neutral in which the transmission element 4 is at an axial distance to the guide segments 18, 20 of the restraining member 13. In the second position of the transmission element 4, shown in broken line, the flanged edge 8 rests against the deflector ramp 19 of the guide segment 18. This second position is assumed by the transmission element 4 in the shifting lane 30 including a forward gear, here the fifth gear, and the reverse gear. The deflector ramp 19 causes a rotation of the transmission element 4, recognizable by the upwardly shifted position of the bushing 5, shown in broken line. The deflector ramp 19, which is inclined at an angle relative to the longitudinal axis 27, effects, in addition, in axial direction a force component which realizes a shift comfort enhancing deflection.

Referring again to FIG. 5, it can be seen that the position of the restraining member 13 with respect to the transmission element 4 is adjustable by an adjustment screw 23 which is received in the wall of the housing 3 and forms an impact point for the guide segment 18. An example for an adjustment screw 23 includes a stud screw. The positional adjustment of the restraining member 13 by means of the adjustment screw 23 results in an optimum reverse gear lock-out function. Moreover, the adjustment screw 23 permits a compensation of tolerances of all components that contribute to the lock-out function.

Figure 6:
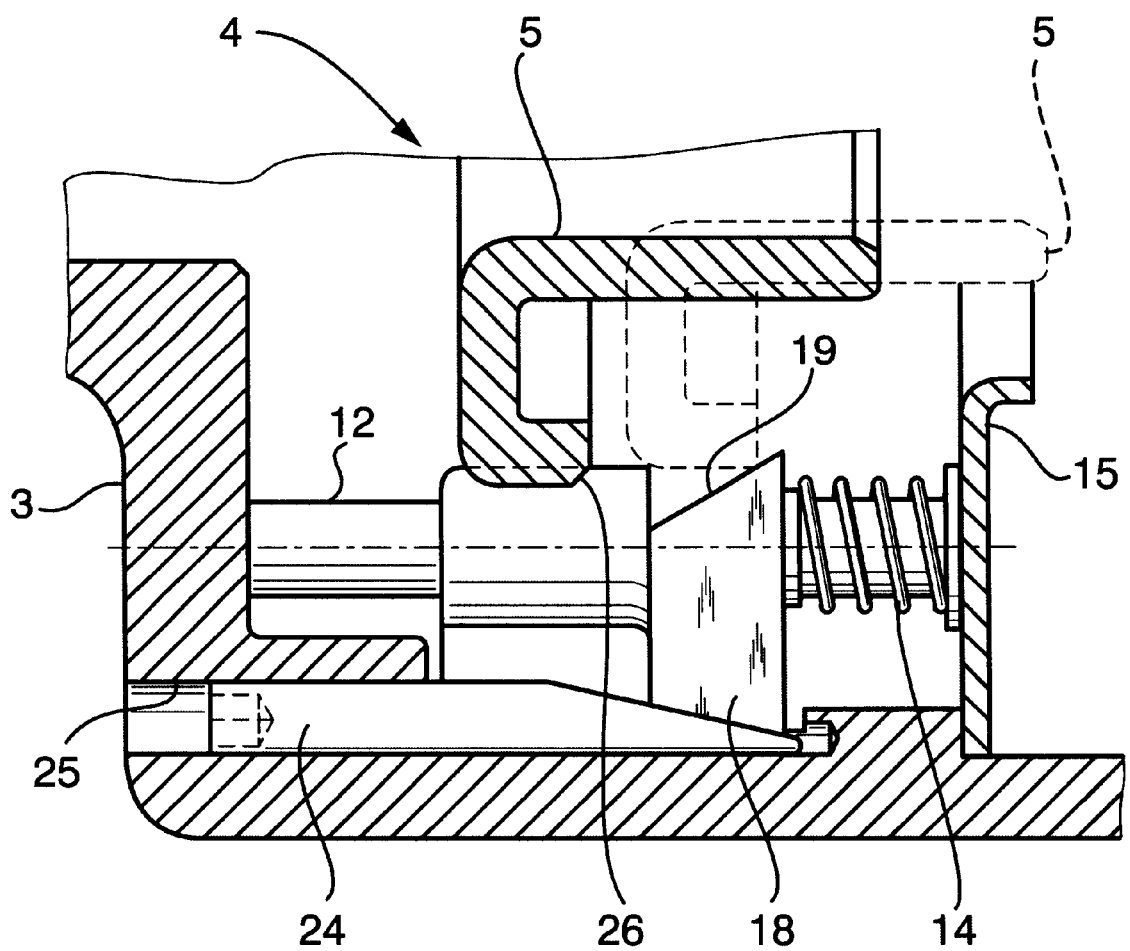
FIG. 6 is a sectional view, on an enlarged scale, of the gearbox of FIG. 2, showing a variation for adjusting the restraining member.

Turning now to FIG. 6, there is shown a gearbox which is equipped with a modified adjustment means of the restraining member 13. The housing 3 is formed with a bore 25 in parallel disposition to the axle 12 for receiving a key pin 24. The key pin 24 has on one end a wedge surface in conformity with a complementarily designed surface of the guide segment 18. After adjusting the position of the restraining member 13, the key pin 24 is held in place by any suitable retention member (not shown). Persons skilled in the art will understand that the adjustment means, shown in FIGS. 5 and 6, for the restraining member 13 to realize an effective compensation of tolerances of the restraining member 13, are described by way of example only, and other variations should be considered within the scope of the present invention as well.

FIG. 6 further shows a variation of the transmission element 4 in which the bushing 5 has a slanted guide area 26 in conformity to the deflector ramp 19 to realize a broad contact area with the restraining member 13 as opposed to a line contact that is subject to increased wear.

While the invention has been illustrated and described as embodied in a locking mechanism for a selector shaft of a change-speed gearbox for preventing inadvertent shifting into reverse, it is not intended to be limited to the details shown since various modifications and structural changes may be made without departing in any way from the spirit of the present invention.

What is claimed as new and desired to be protected by Letters Patent is set forth in the appended claims:

1. A shift control apparatus for use in a change-speed gearbox of motor vehicles; comprising:
   a housing;
   a selector shaft axially slidably and rotatably supported in the housing and operatively connected to a gear selector lever for axial displacement of the selector shaft to realize a preselection of a shifting lane and rotation of the selector shaft for shift into a selected gear;
   a shifter finger secured to the selector shaft and engaging slidable shifter forks or shifter bars; and
   a locking mechanism for preventing a misshift between a reverse gear and a forward gear in a same shifting lane, said locking mechanism including a transmission element mounted in fixed rotative engagement with the selector shaft and having a flanged edge, and a restraining member rotatable and axially moveable in parallel relationship to the selector shaft, said restraining member having a locking surface forming a deflector ramp configured for support of the flanged edge of the transmission element, said deflector ramp applying a force component in axial direction on the transmission element in synchronism to a rotational movement of the restraining member.

2. The apparatus of claim 1 wherein the restraining member defines a longitudinal axis, said deflector ramp extending at an angle of inclination relative to the longitudinal axis.

3. The apparatus of claim 1 wherein the deflector ramp forms a slanted straight line.

4. The apparatus of claim 1 wherein the deflector ramp has at least one section of concave configuration.

5. The apparatus of claim 1 wherein the deflector ramp has at least one section of partially convex configuration.

6. The apparatus of claim 1, and further comprising adjusting means for adjusting the restraining member with respect to the transmission element.

7. The apparatus of claim 6 wherein the adjusting means includes an adjustment screw inserted in the housing.

8. The apparatus of claim 1, and further comprising position adjusting means for maintaining a correct position of the restraining member, said position adjusting means including a key pin received in a bore of the housing.

9. The apparatus of claim 1 wherein the restraining member has a tubular section guided along an axle mounted in the housing.

10. The apparatus of claim 9 wherein the tubular section includes a radial first guide segment forming the deflector ramp and interacting with the flanged edge of the transmission element.

11. The apparatus of claim 10 wherein the restraining member has a second guide segment arranged in angular offset relationship to the first guide segment and supported by the housing when the restraining member is in neutral.

12. The apparatus of claim 1 wherein the flanged edge of the transmission element has a guide surface conforming to the deflector ramp.

13. A shift control apparatus for use in a change-speed gearbox of motor vehicles; comprising:

a housing;

a selector shaft axially slidably and rotatably supported in the housing and operatively connected to a gear selector lever for axial displacement of the selector shaft to realize a preselection of a shifting lane and rotation of the selector shaft for shift into a selected gear;

a shifter finger secured to the selector shaft and engaging slidable shifter forks or shifter bars; and a locking mechanism for preventing a misshift between a reverse gear and a forward gear in a same shifting lane, said locking mechanism including a transmission element mounted in fixed rotative engagement with the selector shaft and having a flanged edge, and a restraining member rotatable and axially moveable in parallel relationship to the selector shaft, said restraining member having a locking surface forming a slanted deflector ramp configured for support of the flanged edge of the transmission element and effect a rotation of the transmission element during shift.

14. The apparatus of claim 13 wherein the deflector ramp has at least one section of concave configuration.

15. The apparatus of claim 13 wherein the deflector ramp has at least one section of partially convex configuration.

16. The apparatus of claim 13 wherein the restraining member has a tubular section guided along an axle mounted in the housing.

17. The apparatus of claim 16 wherein the tubular section includes a radial first guide segment forming the deflector ramp and interacting with the flanged edge of the transmission element.

18. The apparatus of claim 13 wherein the flanged edge of the transmission element has a guide surface conforming to the deflector ramp.

* * * * *